United States Patent
Lentz et al.

(10) Patent No.: US 11,353,627 B2
(45) Date of Patent: Jun. 7, 2022

(54) COMPACT STAR TRACKER WITH PHOTONIC CRYSTAL POINTING

(71) Applicant: US Gov't as represented by Secretary of Air Force, Wright-Patterson AFB, OH (US)

(72) Inventors: Joshua Lentz, Niceville, FL (US); Kevin Brink, Ft Walton Beach, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 320 days.

(21) Appl. No.: 16/851,906

(22) Filed: Apr. 17, 2020

(65) Prior Publication Data

US 2021/0033750 A1    Feb. 4, 2021

Related U.S. Application Data

(60) Provisional application No. 62/880,991, filed on Jul. 31, 2019.

(51) Int. Cl.
*G02B 1/00* (2006.01)
*G02B 6/122* (2006.01)
(Continued)

(52) U.S. Cl.
CPC ............ *G02B 1/005* (2013.01); *G01S 3/7867* (2013.01); *G02B 6/1225* (2013.01); *G02B 23/105* (2013.01)

(58) Field of Classification Search
CPC .... G02B 1/005; G02B 6/1225; G02B 23/105; G02B 26/0808; G02B 26/0891; G01S 3/7867
See application file for complete search history.

(56) References Cited

U.S. PATENT DOCUMENTS 7,414,594 B2   8/2008   Kim et al.
7,439,938 B2   10/2008  Cho et al.
(Continued)

FOREIGN PATENT DOCUMENTS

| JP | 3815374 B2 * | 8/2006 | ............... G09F 9/40 |
| KR | 20150019841 A * | 2/2015 | ............... G06F 1/181 |
| WO | WO-2014209510 A1 * | 12/2014 | ............... G01B 9/06 |

OTHER PUBLICATIONS

Anderson, P., et al., "Improving emission uniformity and linearizing band dispersion in nanowire arrays using quasi-aperiodicity," Optical Materials Express, vol. 7, No. 10, Oct. 1, 2017, pp. 3634-3642.
(Continued)

*Primary Examiner* — Daniel Petkovsek
(74) *Attorney, Agent, or Firm* — AFMLCLO/JAZ; David E. Franklin

(57) ABSTRACT

A star tracker includes imaging optics comprising a folding mirror, a lens, and a detector. The folding mirror bends light received from an optical axis through the lens that focuses the bent light onto the detector. The star tracker includes a steering mechanism that steers light from an adjustable field of view (FOV) to the optical axis of the imaging optics. The steering mechanism includes: (i) a first photonic crystal element comprising beam pointing spatially variant photonic crystals (SVPCs); (ii) a second photonic crystal element comprising beam pointing SVPCs that is positioned adjacent and axially aligned with the first photonic crystal element; and (iii) a housing that receives the first and second photonic crystal elements for independent rotation.

2 Claims, 3 Drawing Sheets

Figure 1:
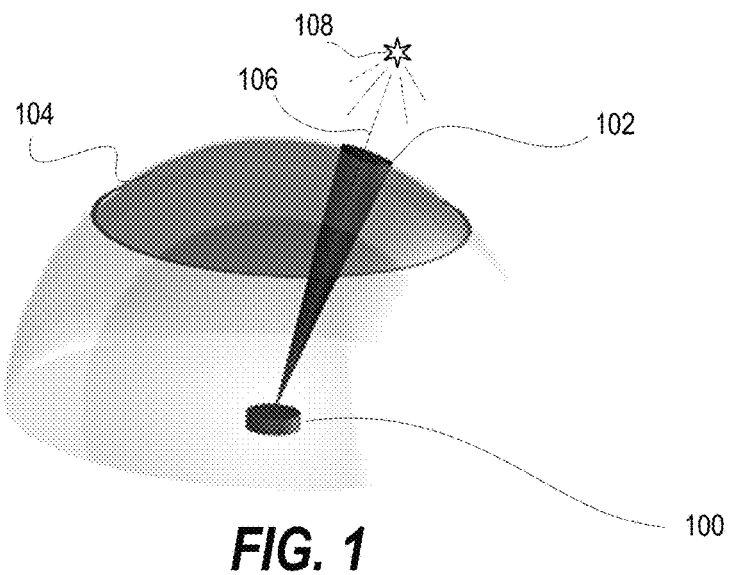
Figure 2:
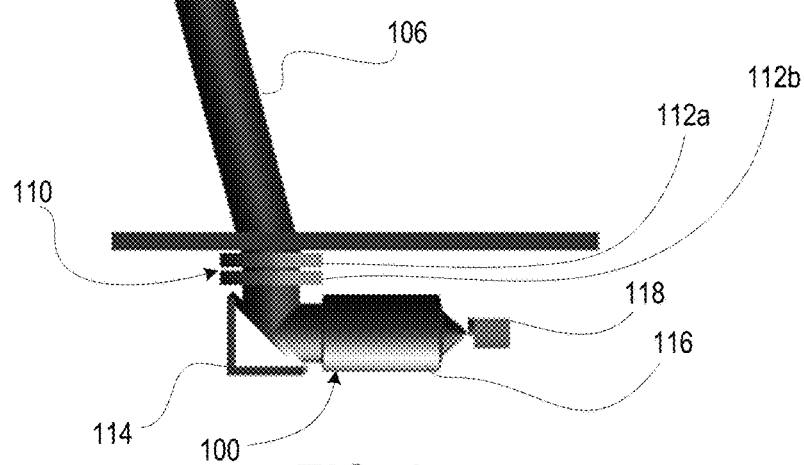
Figure 3:
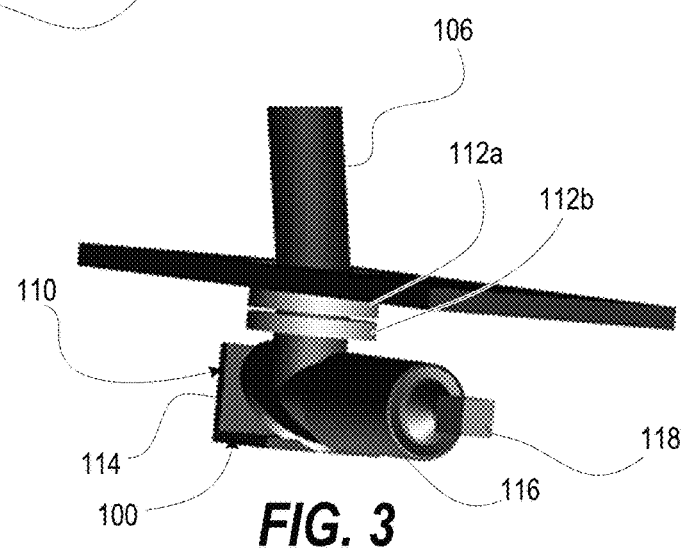

(51) Int. Cl.
*G02B 23/10* (2006.01)
*G01S 3/786* (2006.01)

(56) References Cited

U.S. PATENT DOCUMENTS

| | | | |
|---|---|---|---|
| 7,615,398 | B2 | 11/2009 | McKenzie et al. |
| 7,719,744 | B2 | 5/2010 | Won et al. |
| 7,768,023 | B2 | 8/2010 | Diana et al. |
| 7,772,606 | B2 | 8/2010 | Cao et al. |
| 7,903,239 | B2 | 3/2011 | Sailor et al. |
| 8,298,032 | B2 | 10/2012 | Potts et al. |
| 8,330,900 | B2 | 12/2012 | Kuo et al. |
| 8,363,303 | B2 | 1/2013 | Horning et al. |
| 8,648,771 | B2 | 2/2014 | Hwu et al. |
| 8,907,863 | B2 | 12/2014 | Li |
| 8,947,765 | B2 | 2/2015 | Han et al. |
| 9,157,856 | B2 | 10/2015 | Guo et al. |
| 9,195,092 | B2 | 11/2015 | Escuti et al. |
| 9,395,472 | B2 | 7/2016 | Kim et al. |
| 9,398,274 | B2 | 7/2016 | Jeong et al. |
| 9,454,339 | B2 | 9/2016 | Han et al. |
| 9,638,946 | B2 | 5/2017 | Lee et al. |
| 9,726,783 | B2 | 8/2017 | Perrier-Cornet et al. |
| 9,870,194 | B2 | 1/2018 | Bang |
| 11,143,860 | B1* | 10/2021 | Lentz ............ G02B 1/005 |
| 2006/0274189 | A1* | 12/2006 | Mouli ............ H01L 31/02165 348/340 |
| 2008/0238811 | A1* | 10/2008 | Winsor ............ H01Q 15/10 343/911 R |
| 2015/0036059 | A1 | 2/2015 | Momonoi et al. |
| 2016/0161822 | A1 | 6/2016 | Kim et al. |
| 2016/0259090 | A1 | 9/2016 | Jiang et al. |
| 2016/0316578 | A1 | 10/2016 | Cha |
| 2017/0123288 | A1 | 5/2017 | Dmitriev et al. |
| 2017/0159206 | A1 | 6/2017 | Li et al. |
| 2017/0163946 | A1 | 6/2017 | Komanduri et al. |
| 2018/0113320 | A1 | 4/2018 | Lee |
| 2018/0122143 | A1 | 5/2018 | Ellwood, Jr. |
| 2019/0331756 | A1* | 10/2019 | Jungwirth ......... G02B 26/0891 |
| 2021/0033849 | A1* | 2/2021 | Lentz ............ G02B 26/0883 |

OTHER PUBLICATIONS

Liu, X., et al., "Full-spectrum light management by pseudo-disordered moth-eye structures for thin film solar cells," Optics Express, vol. 25, No. 16, Aug. 7, 2017, pp. A824-A839.

Liu, L., et al., "A strain-tunable nanoimprint lithography for linear variable photonic crystal filters," Nanotechnology, vol. 27, No. 29, Jun. 8, 2016, pp. 1-6.

Rumpf, R., et al., "Spatially variant periodic structures in electromagnetics," Phil. Trans. R. Soc. A 373, Aug. 28, 2015, pp. 1-22.

Digaum, J., et al., "Beam-bending in spatially variant photonic crystals at telecommunications wavelengths," Proc. SPIE 9759, Advanced Fabrication Technologies for Micro/Nano Optics and Photonics IX, Mar. 14, 2016, pp. 375911-1 through 975911-6.

Beaulieu, M., et al., "Large-Area Printing of Optical Gratings and 3D Photonic Crystals Using Solution-Processable Nanoparticle/Polymer Composites," ACS Photonics 2014, 1 (9), Aug. 11, 2014, pp. 799-805.

Sun, T., et al., "Photonic crystal structures on nonflat surfaces fabricated by dry lift-off soft UV nanoimprint lithography," Journal of Micromechanics and Microengineering, vol. 23, No. 12, Oct. 30, 2013, pp. 1-7.

Calafiore, G., et al., "Printable photonic crystals with high refractive index for applications in visible light," Nanotechnology, vol. 27, No. 11, Feb. 15, 2016, pp. 1-7.

Pazos, J., "Digitally Manufactured Spatially Variant Photonic Crystals," Doctoral Dissertation, Department of Eleclrical and Computer Engineering, The University of Texas at El Paso, 2014, 102 pages.

* cited by examiner

COMPACT STAR TRACKER WITH PHOTONIC CRYSTAL POINTING

CROSS-REFERENCE TO RELATED APPLICATIONS

This application claims the benefit of priority under 35 U.S.C. § 119(e) to U.S. Provisional Application Ser. No. 62/880,991 entitled " Compact Star Tracker with Photonic Crystal Pointing", [Docket AFD-1886P] filed 31 Jul. 2019, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to optical devices and more particular to celestial optical tracking devices.

2. Description of the Related Art

Traditional star trackers employ detectors fixed to refractive lenses or reflective telescopes which are then pointed around a field of regard (FOR) using a gimbal, flat mirror or Risley prisms as the pointing mechanism. This approach leads to a continuous, symmetrical portion of hemispherical field of regard (FOR) that can be accessed by the steered field of view (FOV) of the optics, limited by the steering system of either Risley prisms or a gimbal mechanism. A gimbal mechanism provides a wide field of view; however, the size and weight requirements of the gimbaled system are quite high. The Risley prism approach introduces refractive errors that are difficult to correct for in systems that detect an extended spectrum.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1 is an isometric diagram of celestial tracking device ("star tracker") having a steerable field of view (FOV) within a field of regard (FOR), according to one or more embodiments;

FIG. 2 is a side view of the star tracker of FIG. 1 having a steering system that enables detection of a light beam that is off-axis, according to one or more embodiments;

FIG. 3 is an isometric view of the star tracker of FIG. 1, according to one or more embodiments;

FIG. 4 is a diagram of a generally-known steering mechanism having Risley prisms used for steering with no angle;

FIG. 5 is the generally-known steering mechanism having Risley prisms adjusted for an induced angle;

FIG. 6 is a diagram of a steering mechanism FIG. 1 having polarization gratings and photonic crystal beam steering oriented to no angle, according to one or more embodiments;

FIG. 7 is a diagram of the steering mechanism of FIG. 1 having polarization gratings and photonic crystal beam steering oriented to an offset angle, according to one or more embodiments;

FIG. 8 is a functional block diagram of a star tracker having a motorized steering mechanism that is oriented to a zero angle, according to one or more embodiments; and FIG. 9 is a functional block diagram of a star tracker having a motorized steering mechanism that is oriented to an offset angle, according to one or more embodiments.

DETAILED DESCRIPTION

The present innovation provides a celestial tracking device (referred to in this document generically as a star tracker), particularly as the hardware used for celestial body sightings. Rotating photonic crystals are provided for beam pointing and a flat mirror is used to fold the optical path, making the star tracker more compact. In particular, the photonic crystal pointing requires specially designed spatially variant photonic crystals (SVPCs).

FIG. 1 depicts a celestial tracking device ("star tracker") 100 that is steerable to a field of view (FOV) 102 within a total field of regard (FOR) 104 to track a light beam 106 from a celestial object 108. FIGS. 2-3 depict a side view and an isometric view of the star tracker 100 having a steering system 110 that enables detection of the light beam 106 that is off-axis. The steering system 110 is composed of a pair of rotating photonic crystal elements **112*a*, 112*b* designed for optical deflection. The steering system 110 is analogous to Risley prisms and can be applied having reduced size and weight and with increased performance by eliminating the refractive errors inherent in prisms. In this manner, the total FOR 104 (FIG. 1) as a solid portion of a hemisphere is accessible. The FOV 102 is a function of the imaging optics within the star tracker 100, which include a folding mirror 114, lens 116, and detector 118. The FOR 104 is a function of the angular deflection provided by the two photonic crystal elements 112*a*, 112*b*. Because the photonic crystal elements 112*a*, 112*b* used for pointing are very lightweight, the requirements on the rotation control of the steering system 110 is reduced, ultimately lowering the power requirements for the steering system 110, which can further reduce the size and weight of the star tracker 100**.

Star trackers can be used as stellar navigation aids on platforms (vehicles, telescopes, cameras, etc.) that are ground, air, sea or space-based, each with its own performance, size, weight and power restrictions. For example, a sea-based platform may be able to use a larger form factor and weight but has to contend with atmosphere. Space-based applications likely have more stringent limitations on both form factor and power consumption, but have no atmosphere to contend with. The star tracker innovation presented herein directly addresses small form factor needs but is also valid for applications with more relaxed requirements.

The key components of the present innovation is the use of a pair of photonic crystals designed for fixed deviation angles and each mounted in its own respective rotation stage. The photonic crystal pointing requires specially designed SVPCs. All mounted plates are located on the primary optical axis and rotations of the plates allows the FOV of the system to be adjusted around the FOR. This is an analog to Risley prisms or their polarization grating alternative, Risley gratings. An SVPC structure is deposited on a substrate selected for the spectrum and environment of interest. Relevant SVPC designs for beam deflection are described in references [1-3] and have recently been reported to be self-collimating while re-directing energy at an angle of 90 degrees [4-5]. Other, lower angular deviations are also possible using the same techniques.

Figure 4:
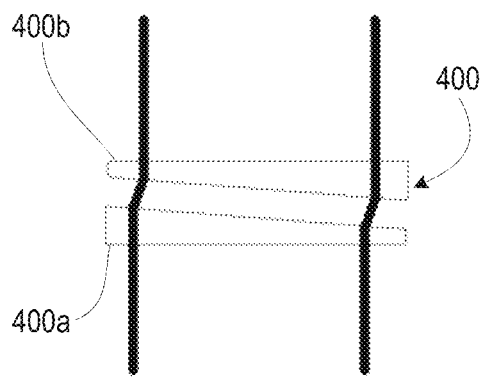
Figure 5:
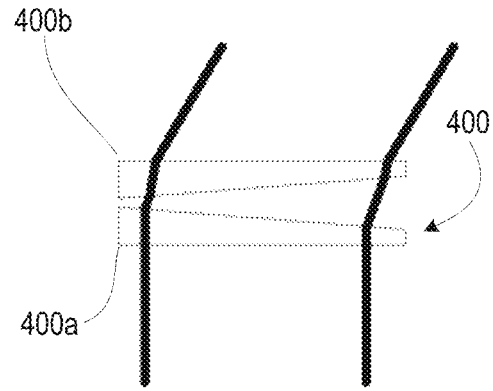

FIG. 4 depicts a generally-known steering mechanism 400 having Risley prisms 402a, 402b that are used for steering with no angle. FIG. 5 depicts the generally-known steering mechanism 400 having Risley prisms 402a, 402b adjusted for an induced angle. The two prisms 402a, 402b are rotated to effect various steering angles around the two dimensional (2D) angular region of interest.

Figure 6:
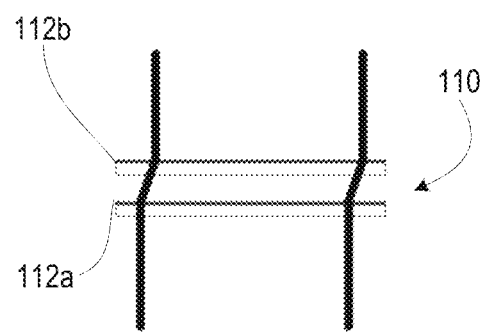
Figure 7:
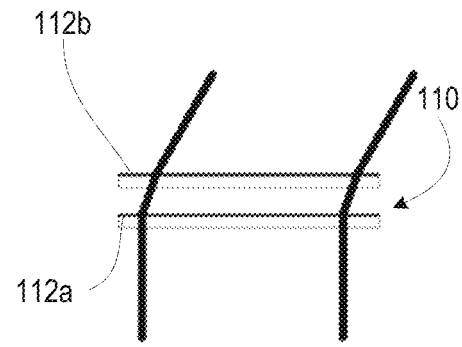

FIG. 6 depicts the steering mechanism 110 having polarization gratings and photonic crystal beam steering that can be accomplished with no angle. FIG. 7 depicts the steering mechanism 110 having polarization gratings and photonic crystal beam steering that can be accomplished with an angular offset, in a completely analogous manner to the Risley prisms but with no induced aberrations.

Figure 8:
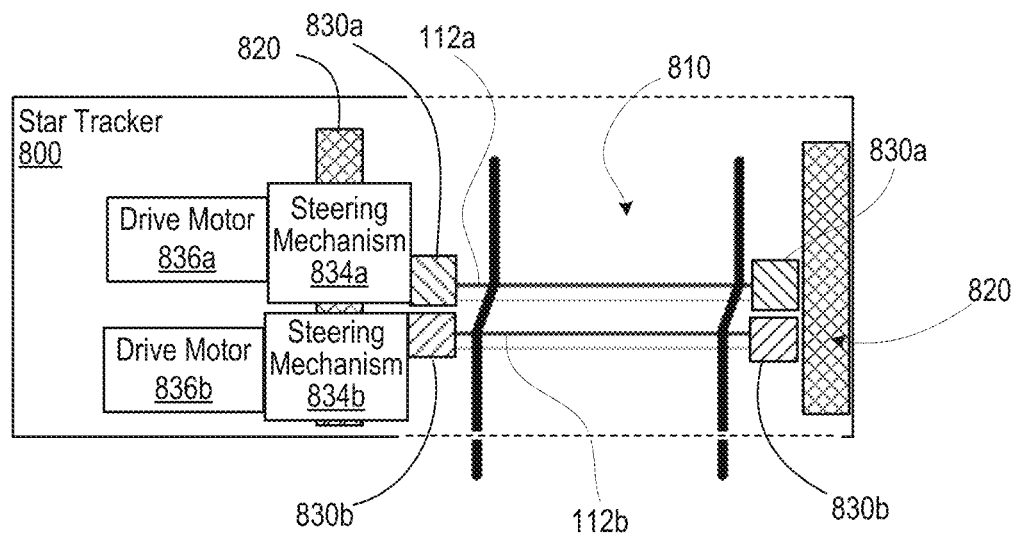
Figure 9:
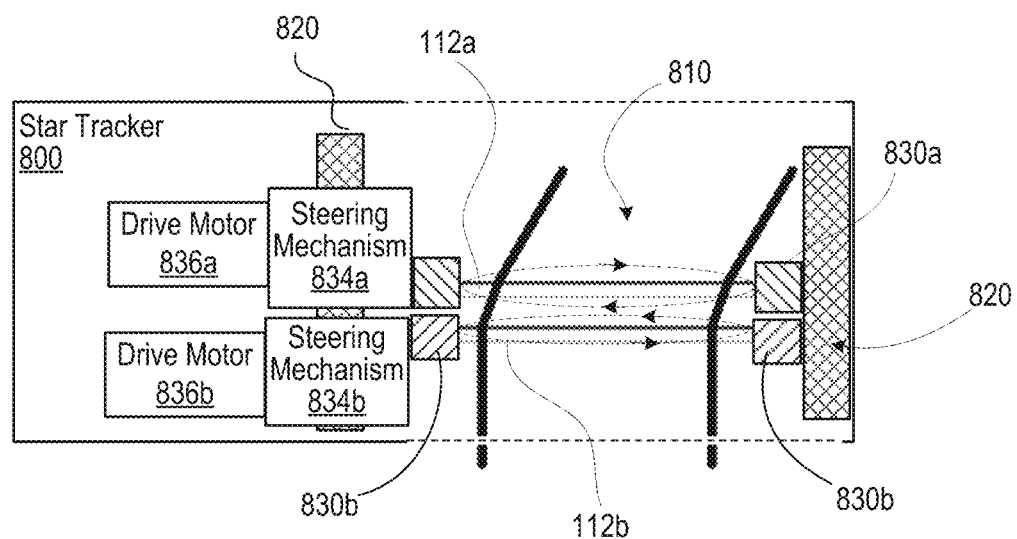

In one or more embodiments, FIGS. 8-9 depict a star tracker 800 having a motorized steering mechanism 810 that is mounted to a housing 820. A first rotational sleeve 830a is annularly attached to the first photonic crystal element 112a. A second rotational sleeve 830b is annularly attached to the second photonic crystal element 112b. The housing 822 receives for rotation in axial alignment the adjacent first and the second rotational sleeves 830a, 830b. A first motorized steering mechanism 834a is actuated by a first steering drive motor 436a to selectively rotate the first rotational sleeve 830a in the housing 820. A second motorized steering mechanism 834b is actuated by a second steering drive motor 436b to selectively rotate the second rotational sleeve 830b in the housing 820. The combination of the rotational positions of the first and the second rotational sleeves 830a, 830b changes zero degree FOV 840a (FIG. 8) to an induced angle FOV 840b (FIG. 9).

All components of the present innovation except for the photonic crystals can be made using standard techniques. Fabrication methods for the photonic crystal are generally specific to the photonic crystal design selected. As such, fabrication methods for the present innovation cannot be prescribed in general, but several methods are available in literature [5-9] and several methods have been patented [10-15]. Similarly, the actual photonic crystal designs depend heavily on the spectrum of interest, polarization characteristics, deflection angle required, substrate materials, FOV, etc. and generally cannot be determined without Finite Difference Time Domain or other computational electromagnetics modeling software routines.

The present innovation is distinct from generally-known star tracker systems which: (a) Have all sensor hardware (baffle, detector, lens) installed on a gimbal to allow full FOR sighting; (b) Have a fixed lens and movable sensor [16]; or (c) Have a wide field lens, rotating base and movable baffle to select desired FOV from the FOR [17].

In one or more embodiments, the present innovation consists of the hardware for celestial navigation systems that could be used in conjunction with star catalogs and processing equipment in a manner similar to that discussed in [18].

One embodied variant of the above system utilizes multiple OAPs and one or more detectors on a single rotation platform, sharing a common window. The additional optical axes would allow for sampling additional portions of the sky, increasing the availability. Additional Off-Axis Parabolic (OAPs) can be used to sense different magnitude stars, different inclination rings, different spectra, etc.

In one or more embodiments, thermal compensation mechanisms may be included in any embodiment to allow focus compensation during large temperature or pressure changes. An embodiment includes a single photonic crystal or other optical element in a rotation stage to access a FOR that is limited to a ring. Embodied variants include more than two photonic crystal devices to enhance pointing speed or pointing accuracy.

The following references (1)-(18) are hereby incorporated by reference in their entirety:

(1) P. Duke Anderson, Daniel D. Koleske, Michelle L. Povinelli, and Ganapathi Subramania, "Improving emission uniformity and linearizing band dispersion in nanowire arrays using quasi-aperiodicity," Opt. Mater. Express 7, 3634-3642 (2017);

(2) Liu, Xiaojun & Da, Yun & Xuan, Yimin. (2017). Full-spectrum light management by pseudo-disordered moth-eye structures for thin film solar cells. Optics Express. 25. A824;

(3) Liu, Longju & Hurayth, Abu & Li, Jingjing & Hillier, Andrew & Lu, Meng. (2016). A strain-tunable nanoimprint lithography for linear variable photonic crystal filters. Nanotechnology. 27. 295301;

(4) Rumpf, R. C., Pazos, J. J., Digaum, J. L., & Kuebler, S. M. (2015). Spatially variant periodic structures in electromagnetics. Philosophical Transactions of the Royal Society A: Mathematical, Physical and Engineering Sciences, 373(2049);

(5) Jennefir L. Digaum, Rashi Sharma, Daniel Batista, Javier J. Pazos, Raymond C. Rumpf, Stephen M. Kuebler, "Beam-bending in spatially variant photonic crystals at telecommunications wavelengths", Proc. SPIE 9759, Advanced Fabrication Technologies for Micro/Nano Optics and Photonics IX, 975911 (14 Mar. 2016);

(6) Beaulieu, Michael & Hendricks, Nicholas & Watkins, James. (2014). Large-Area Printing of Optical Gratings and 3D Photonic Crystals Using Solution-Processable Nanoparticle/Polymer Composites. ACS Photonics;

(7) Sun, Tangyou & Xu, Zhimou & Xu, Haifeng & Zhao, Wenning & Wu, Xinghui & Liu, Sisi & Ma, Zhichao & He, Jian & Liu, Shiyuan & Peng, Jing. (2013). Photonic crystal structures on nonflat surfaces fabricated by dry lift-off soft UV nanoimprint lithography. Journal of Micromechanics and Microengineering. 23;

(8) Calafiore, Giuseppe & Fillot, Quentin & Dhuey, Scott & Sassolini, Simone & Salvadori, Filippo & Prada, Camilo & Munechika, Keiko & Peroz, Christophe & Cabrini, Stefano & Piña-Hernandez, Carlos. (2016). Printable photonic crystals with high refractive index for applications in visible light. Nanotechnology. 27;

(9) Pazos, j. (2010). Digitally manufactured spatially variant photonic crystals. Phd. University of Texas at El Paso.

(10) U.S. Pat. No. 9,195,092, Escuti , et al., "polarization-independent liquid crystal display devices including multiple polarizing grating arrangements and related devices", Aug. 15, 2013

(11) US Pat. Publ. No. 20160259090, Jiang, et al., "photonic crystal supporting high frequency sensitivity self-collimation phenomenon And design method and use thereof", Sep. 8, 2016

(12) US Pat. Publ. No. 20170123288, Dmitriev, et al., "compact optical key based on a two-dimensional photonic crystal with 120 degree Folding", May 4, 2017

(13) U.S. Pat. No. 9,726,783, Perrier-Cornet, et al., "Methods and systems for thermal printing of photonic crystal materials, and thermally Printable photonic crystal materials and assemblies", 2017;

(14) US Pat. Publ. No. 20160161822, kim, et al., "smart glass using guided self-assembled photonic crystal", Jun. 9, 2016;

(15) US Pat. Publ. No. 20170159206, Li, et al., "Method of making photonic crystal", Jun. 8, 2017;

(16) U.S. Pat. No. 8,772,690 B2, Smith, et al., "Multi-functional star tracker with precision focal plane position control for small cubesat-class satellites", Jul. 8, 2014;

(17) U.S. Pat. No. 9,544,488 B2, Dawson, et al., "star tracker with steerable field-of-view baffle coupled to wide field-of-view camera", Jan. 10, 2017; and

(17) McBryde, C., & Lightsey, E. G. (2012). A star tracker design for CubeSats. 2012 IEEE Aerospace Conference, 1-14.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A star tracker comprising:
   imaging optics comprising a folding mirror, a lens, and a detector, the folding mirror bending light received from an optical axis through the lens that focuses the bent light onto the detector; and
   a steering mechanism that steers light from an adjustable field of view (FOV) to the optical axis of the imaging optics, the steering mechanism comprising:
      a first photonic crystal element comprising beam pointing spatially variant photonic crystals (SVPCs);
      a second photonic crystal element comprising beam pointing SVPCs that is positioned adjacent and axially aligned with the first photonic crystal element;
      a housing that receives the first and second photonic crystal elements for independent rotation.

2. The star tracker of claim 1, wherein the steering mechanism comprises:
   a first rotational sleeve that is annularly attached to the first photonic crystal element;
   a second rotational sleeve that is annularly attached to the second photonic crystal element;
   a housing that receives for rotation in axial alignment the adjacent first and the second rotational sleeves;
   a first steering drive motor operatively engaged to the first rotational sleeve to selectively rotate the first rotational sleeve in the housing; and a second steering drive motor operatively engaged to the second rotational sleeve to selectively rotate the second rotational sleeve in the housing.

\* \* \* \* \*